United States Patent
Gurvich

(10) Patent No.: US 12,036,749 B2
(45) Date of Patent: Jul. 16, 2024

(54) METAL COMPOSITE JOINTS FOR COMPOSITE RODS

(71) Applicant: B/E Aerospace, Inc., Winston-Salem, NC (US)

(72) Inventor: Mark R. Gurvich, Middletown, CT (US)

(73) Assignee: B/E Aerospace, Inc., Winston-Salem, NC (US)

(*) Notice: Subject to any disclaimer, the term of this patent is extended or adjusted under 35 U.S.C. 154(b) by 670 days.

(21) Appl. No.: 17/167,659

(22) Filed: Feb. 4, 2021

(65) Prior Publication Data

US 2022/0243750 A1 Aug. 4, 2022

(51) Int. Cl.
| | |
|---|---|
| B29C 65/00 | (2006.01) |
| B21D 39/04 | (2006.01) |
| B29C 57/10 | (2006.01) |
| B29C 65/56 | (2006.01) |
| B29C 65/64 | (2006.01) |

(52) U.S. Cl.
CPC .......... B29C 66/742 (2013.01); B21D 39/048 (2013.01); B29C 57/10 (2013.01); B29C 65/568 (2013.01); B29C 65/64 (2013.01); B29C 66/5221 (2013.01); B29C 66/5344 (2013.01)

(58) Field of Classification Search
CPC .. Y10T 29/49913; F16L 13/007; B21D 39/04; B21D 39/046; B21D 39/048; B29C 57/10; B29C 65/567–568; B29C 65/64; B29C 66/5221; B29C 66/5344; B29C 66/721; B29C 66/742

See application file for complete search history.

(56) References Cited

U.S. PATENT DOCUMENTS

| | | | |
|---|---|---|---|
| 4,006,524 A * | 2/1977 | Frank | B21D 39/04 29/523 |
| 4,392,292 A | 7/1983 | Irons | |
| 4,715,739 A * | 12/1987 | Ruegg | F16C 3/026 403/30 |
| 5,150,519 A | 9/1992 | Unewisse | |
| 5,253,947 A * | 10/1993 | Petrzelka | B29C 66/721 403/285 |
| 5,377,400 A | 1/1995 | Homm | |
| 5,378,023 A * | 1/1995 | Olbrich | F16L 33/2071 285/259 |

(Continued)

FOREIGN PATENT DOCUMENTS

| | | |
|---|---|---|
| DE | 102013019097 A1 | 5/2014 |
| EP | 0513292 B1 | 2/1996 |

(Continued)

OTHER PUBLICATIONS

Extended Search Report in European Application No. 22155261.5 dated Jun. 23, 2022, 11 pages.

Primary Examiner — Matthew P Travers
(74) Attorney, Agent, or Firm — Suiter Swantz IP

(57) ABSTRACT

A method for joining composite rods with tubular shape includes internal and external collars applied to the ends of the composite rod and deformed via unidirectional compressive load applied by a clamp in the radial direction of the composite rod cross-section. The resulting plastic deformation of the metal collars and composite rod interlock those components to support both compressive and tensile loads.

8 Claims, 12 Drawing Sheets

Scheme of non-axisymmetric forming after installation of all parts together

(56) References Cited

U.S. PATENT DOCUMENTS

| | | | |
|---|---|---|---|
| 7,874,925 B2 | 1/2011 | Dewhirst | |
| 10,139,024 B2 | 11/2018 | Hofmann | |
| 2007/0079495 A1* | 4/2007 | Ingram | F16L 33/2073 |
| | | | 29/508 |
| 2007/0296209 A1* | 12/2007 | Conley | F16L 13/143 |
| | | | 285/239 |
| 2009/0239095 A1 | 9/2009 | Desai et al. | |

FOREIGN PATENT DOCUMENTS

| | | |
|---|---|---|
| FR | 2934983 A1 | 2/2010 |
| WO | 2016009208 A1 | 1/2016 |
| WO | 2019225294 A1 | 11/2019 |

* cited by examiner

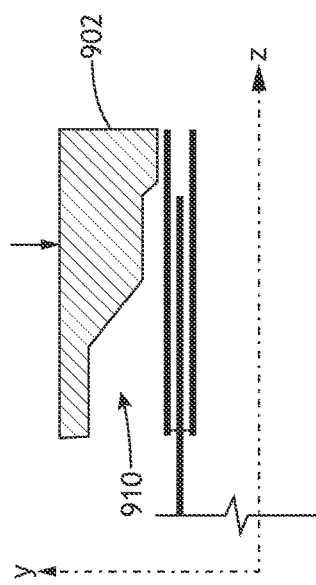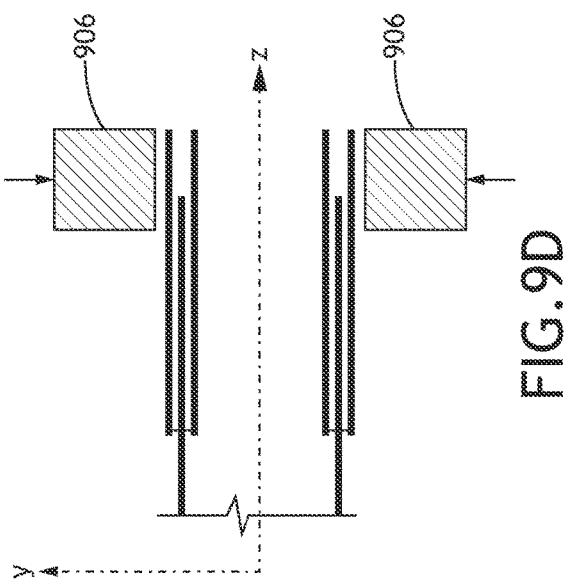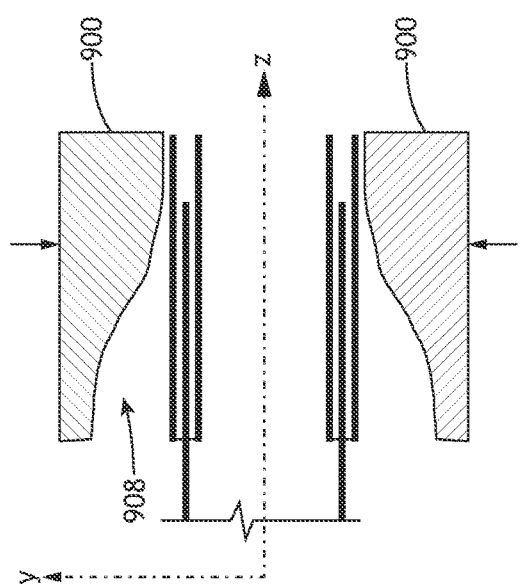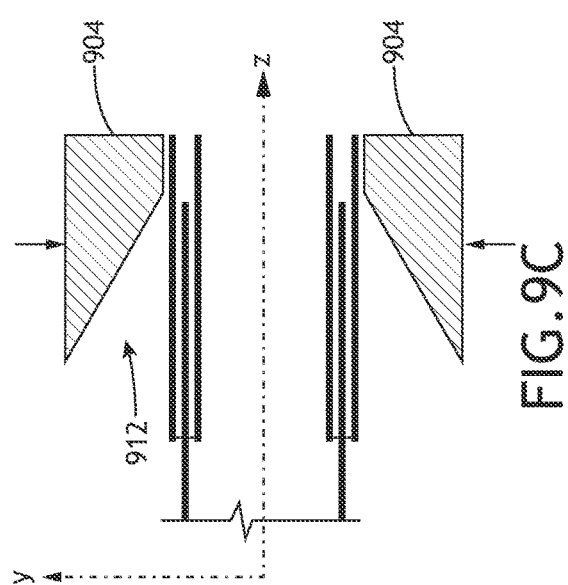

METAL COMPOSITE JOINTS FOR COMPOSITE RODS

BACKGROUND

Composite support structures and frames, such as found in aircraft seats, provide significant weight reduction in comparison with conventional metallic supports and frames. Such systems generally comprise composite rods connected by metallic joints. Composite rods and, especially, composite rods with tubular shapes are relatively inexpensively to fabricate. However, the metallic joints are both heavy and expensive. Even efficient joint designs have complex shapes of monolithic metallic parts requiring considerable, expensive labor. Furthermore, they require significant advance planning with obvious sensitivity to supply chains. It would be advantageous to have a method for joining composite rods in a composite support structure without expensive machining or compromising the structural integrity of the composite rods.

SUMMARY

In one aspect, embodiments of the inventive concepts disclosed herein are directed to a method for joining composite rods with tubular shape without expensive, machined connectors and without compromising the structural integrity of the composite rod. Internal and external collars are applied to the ends of the composite rod and deformed via unidirectional compressive load applied by a clamp in the radial direction of the composite rod cross-section. The resulting plastic deformation of the metal collars and composite rod interlock those components to support both compressive and tensile loads. The deformed metal collars are easily joinable to other components via off-the-shelf hardware.

In a further aspect, the clamp defines any of a plurality of deformation profiles according to the specific application and available space.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 9A shows an axial side cross-sectional view of a deformation clamp with curved shape according to an exemplary embodiment;

FIG. 9B shows an axial side cross-sectional view of a deformation clamp with shape of multiple linear segments according to an exemplary embodiment;

FIG. 9C shows an axial side cross-sectional view of a deformation clamp with sloped shape according to an exemplary embodiment;

FIG. 9D shows an axial side cross-sectional view of a deformation clamp with flat shape according to an exemplary embodiment;

DETAILED DESCRIPTION

Figure 1:
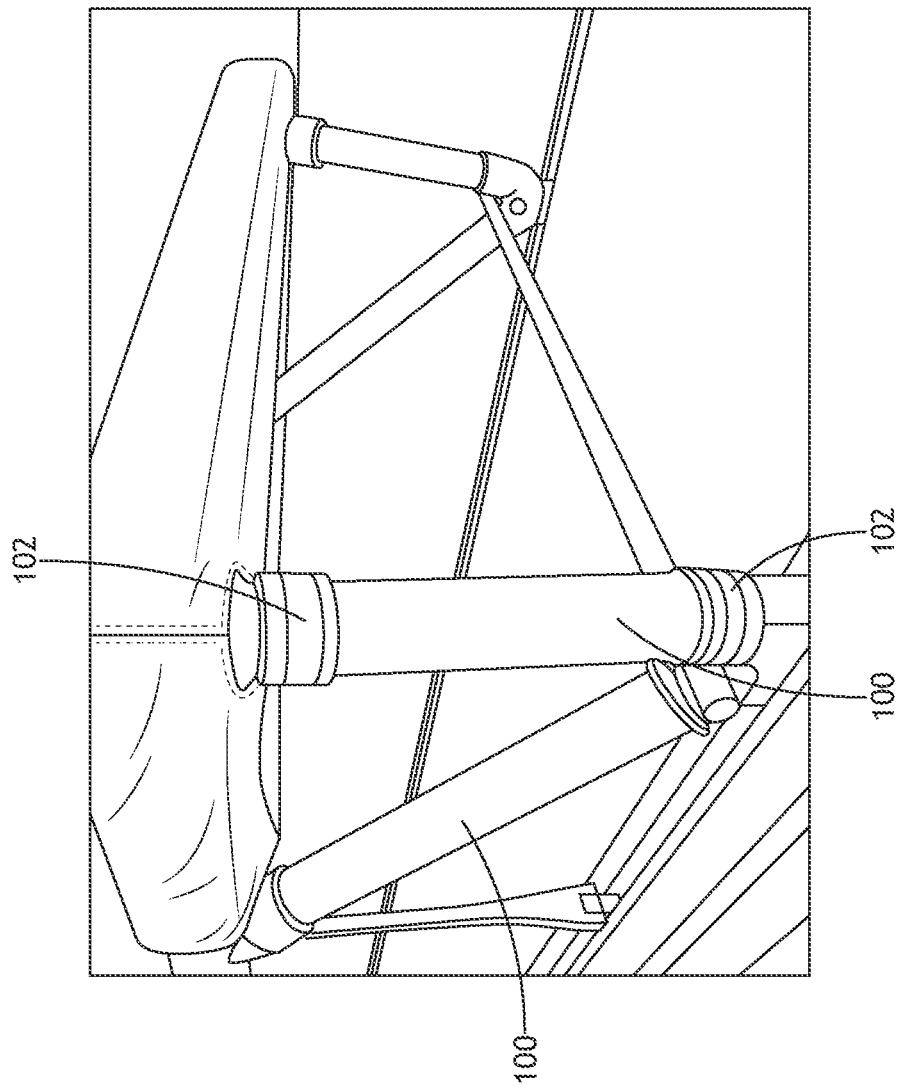
FIG. 1 shows an environmental perspective view of a representative aircraft seat frame including composite rods and hybrid composite metal joints.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method for joining composite rods with tubular shape without expensive, machined connectors and without compromising the structural integrity of the composite rod. Internal and external collars are applied to the ends of the composite rod and deformed via unidirectional compressive load applied by a clamp in the radial direction of the composite rod cross-section. The resulting plastic deformation of the metal collars and composite rod interlock those components to support both compressive and tensile loads. The deformed metal collars are easily joinable to other components via off-the-shelf hardware.

In a further aspect, the clamp defines any of a plurality of deformation profiles according to the specific application and available space.

Referring to FIG. 1, an environmental perspective view of a representative aircraft seat frame including composite rods 100 and hybrid composite metal joints 102 is shown. The composite rods 100 comprise light weight composite tubes produced via some method such as filament-winding, extrusion, wrapping, advanced filament placing (AFP), braiding, etc. In conventional implementations, the metal joints 102 for securing such composite rods 100 together or to other components of the seat frame are traditionally multi-part, machined components specially adapted for the composite rods 100 and specific portion of the seat frame. Thus, they are usually relatively expensive, heavy and can require additional time for placing orders in advance. In some other cases, conventional mechanisms for joining the metal joints 102 to the composite rods 100 may compromise structural integrity of the composite rods 100 due to drilled holes through the composite rods 100 if metallic fasteners (e.g., bolts or rivets) are used.

Composite materials considered in this disclosure are fiber-reinforced polymer matrix materials. The fibers can include, among others, carbon, glass, organic fibers or their combinations. The polymer matrices can include thermoplastic and thermoset polymers. Metallic collars are made of metals or alloys showing plastic deformation at, at least, some levels of applied load.

Figure 2A:
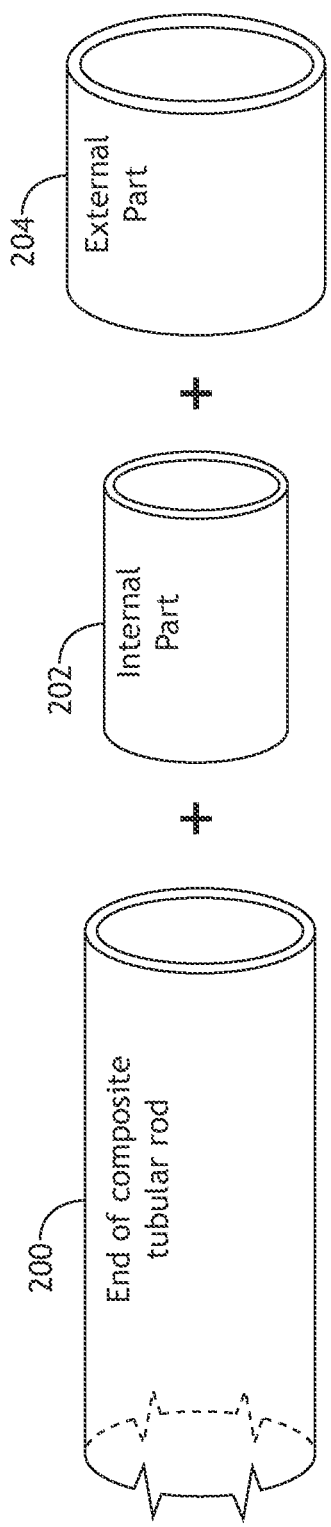
FIG. 2A shows an exploded perspective view of a composite rod and metal collars before mutual positioning during a fabrication process according to an exemplary embodiment.
Figure 2B:
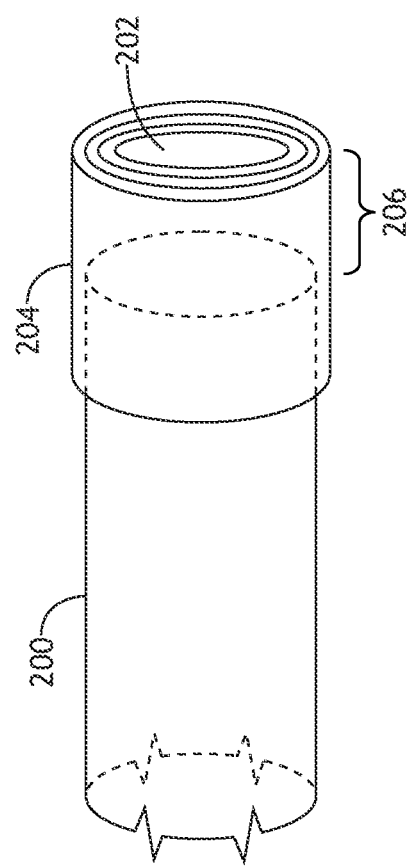
FIG. 2B shows a perspective view of a composite rod and metal collars after mutual positioning during a fabrication process according to an exemplary embodiment.

Referring to FIGS. 2A-2B, exploded perspective views of a composite rod with tubular shape 200 and metal collars with similar tubular shapes 202, 204 during a fabrication process according to an exemplary embodiment are shown. An internal collar 202 is inserted into an end of the composite rod 200 and a corresponding external collar 204 is placed over the end of the composite rod 200 and internal collar 202 such that the end of the composite rod 200 is sandwiched between the internal collar 202 and the external collar 204.

In at least one embodiment, the internal collar 202 and external collar 204 define a producing portion 206 where the internal collar 202 and external collar 204 extend beyond the end of the composite rod 200.

Figure 3:
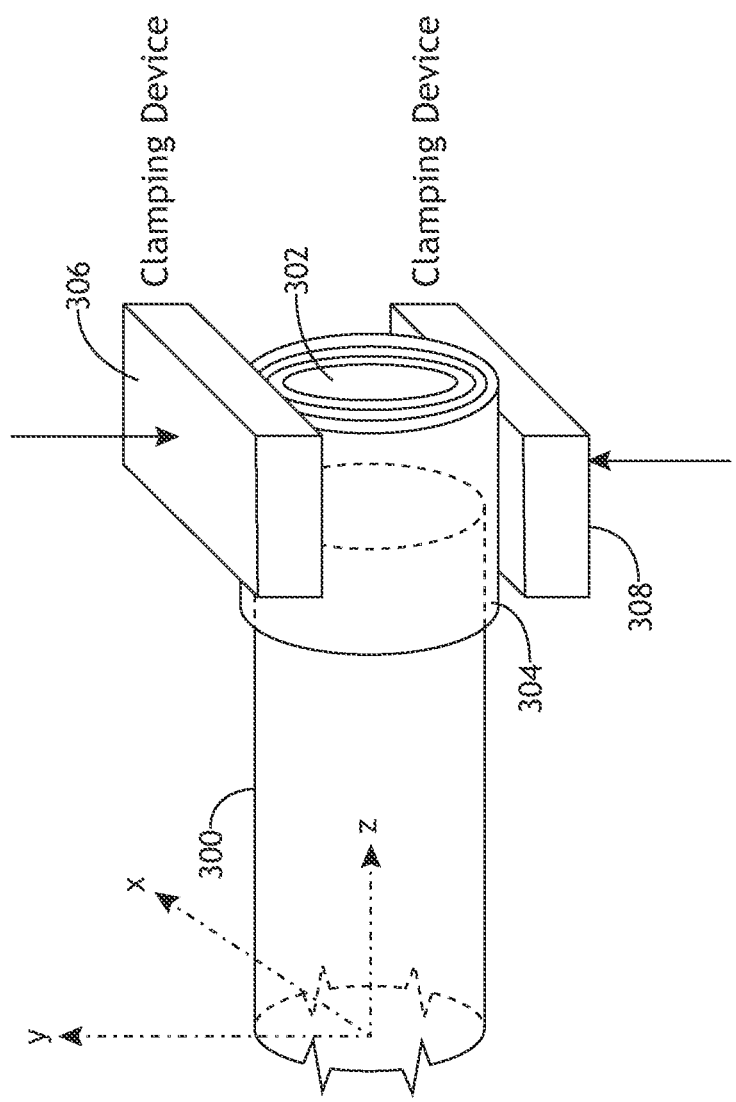
FIG. 3 shows a perspective view of a composite rod and metal collars prepared for clamping during a fabrication process according to an exemplary embodiment.

Referring to FIG. 3, a perspective view of a composite rod 300 and metal collars 302, 304 during a fabrication process according to an exemplary embodiment is shown. Where an internal collar 302 is inserted into the composite rod 300 and a corresponding external collar 304 is placed over the end of the composite rod 300 and internal collar 302, a clamp device 306, 308 is disposed around collars 302, 304, including some portion of the composite rod 300, or at least some terminal portion of the collars 302, 304 and composite rod 300. The clamping load is unidirectional compression applied in the radial direction as shown in FIG. 3.

Figure 4B:
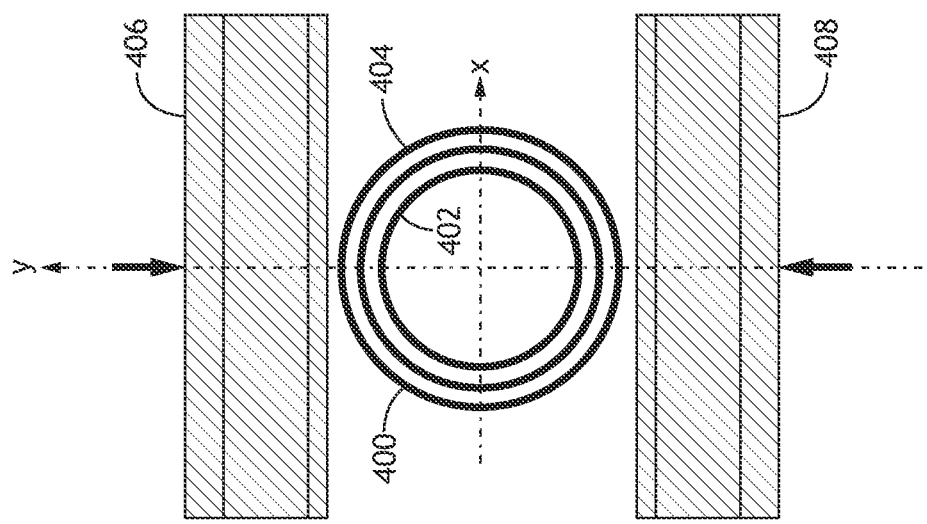
FIG. 4B shows a diametric cross-sectional view of a composite rod and metal collars prepared for clamping during a fabrication process according to an exemplary embodiment.
Figure 4A:
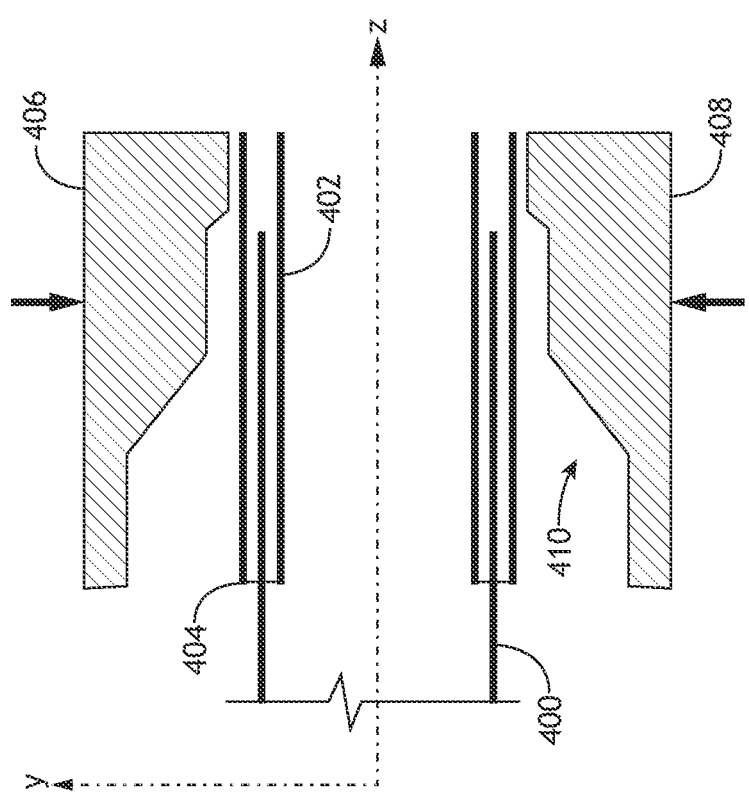
FIG. 4A shows an axial cross-sectional view of a composite rod and metal collars prepared for clamping during a fabrication process according to an exemplary embodiment.

Referring to FIGS. 4A-4B, cross-sectional views of a composite rod 400 and metal collars 402, 404 during a fabrication process according to an exemplary embodiment are shown before the clamping. A clamp device 406, 408 is disposed around a terminal of the composite rod 400 and collars 402, 404. In at least one embodiment, the clamp device 406, 408 defines a deformation profile 410. When sufficient compressive load is applied to the clamp device 406, 408, the terminal of the composite rod 400 and collars 402, 404 are deformed according to the deformation profile 410.

In at least one embodiment, the deformation profile 410 deforms the terminal of the composite rod 400 and collars 402, 404 progressively more from a proximal portion of a distal portion of the clamp device 406, 408.

Figure 5B:
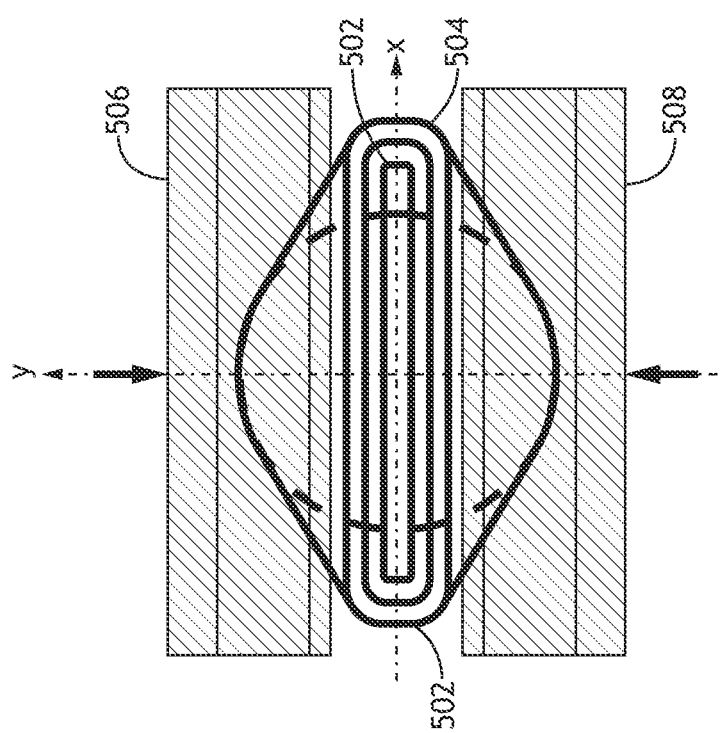
FIG. 5B shows a diametric cross-sectional view of a composite rod and metal collars after clamping during a fabrication process according to an exemplary embodiment.
Figure 5A:
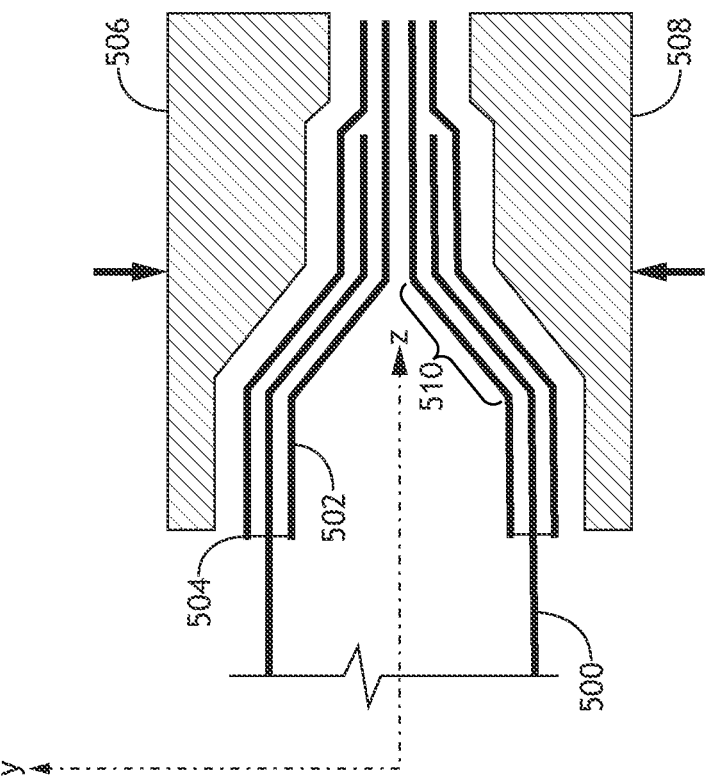
FIG. 5A shows an axial cross-sectional view of a composite rod and metal collars after clamping during a fabrication process according to an exemplary embodiment.

Referring to FIGS. 5A-5B, cross-sectional view of a composite rod 500 and metal collars 502, 504 during a fabrication process according to an exemplary embodiment are shown after the clamping. After a compressive force is applied to a clamp device 506, 508, the terminal of the composite rod 500 and collars 502, 504 are plastically deformed to produce one or more interlocking portions 510 where the composite rod 500, internal collar 502, and external collar 504 are engaged to transfer axial compressive and tensile loads, even without friction between the collars and the composite road.

In at least one embodiment, the clamp device 506, 508 and corresponding deformation profile define a proximal portion that leaves the corresponding portion of the composite rod 500 and collars 502, 504 relatively undeformed. Furthermore, the clamp device 506, 508 and corresponding deformation profile define a distal portion that produces the maximal deformation produced by the clamp device 506, 508, potentially flattening the collars 502, 504. In at least one embodiment, the distal portion may correspond to a portion including only the collars 502, 504, and not the composite rod 500.

Figure 6B:
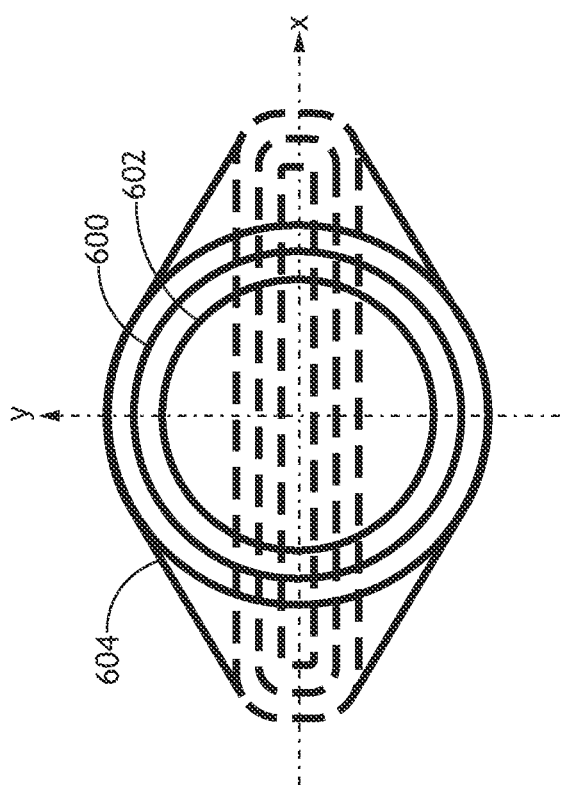
FIG. 6B shows a diametric rear view of a composite rod and metal collars produced after clamping according to an exemplary embodiment.
Figure 6A:
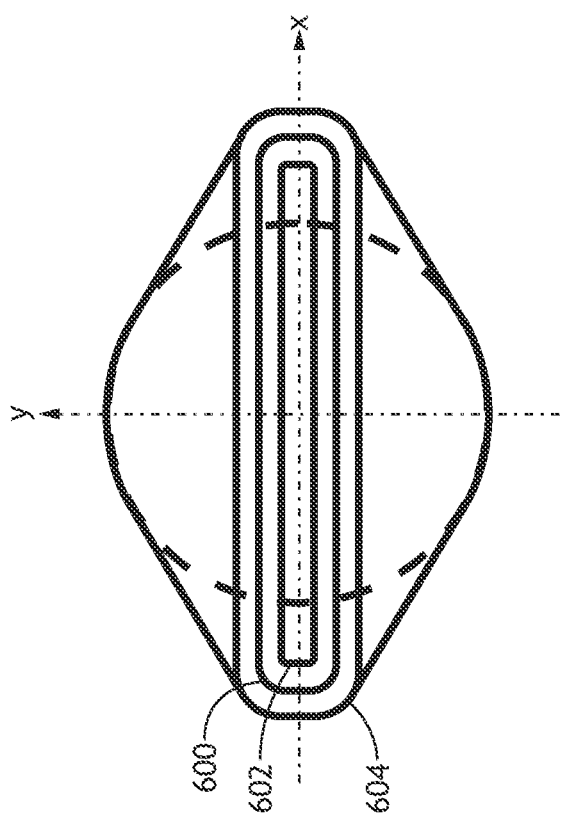
FIG. 6A shows a diametric front view of a composite rod and metal collars produced after clamping according to an exemplary embodiment.

Referring to FIGS. 6A-6B, front and rear diametric views of a composite rod 600 and metal collars 602, 604 produced according to an exemplary embodiment are shown. In a front view (as in FIG. 6A), a flattened metal tab comprising a deformed internal collar 602 and a deformed external collar 604 protrudes from the composite rod 600 that may be connected to other components. In a rear view (as in FIG. 6B), the composite rod 600 retains its shape and therefore structural integrity while protruding from the joint defined by the metal collars 602, 604, with a deformed portion of the composite rod 600 secured within the metal joint.

Figure 7:
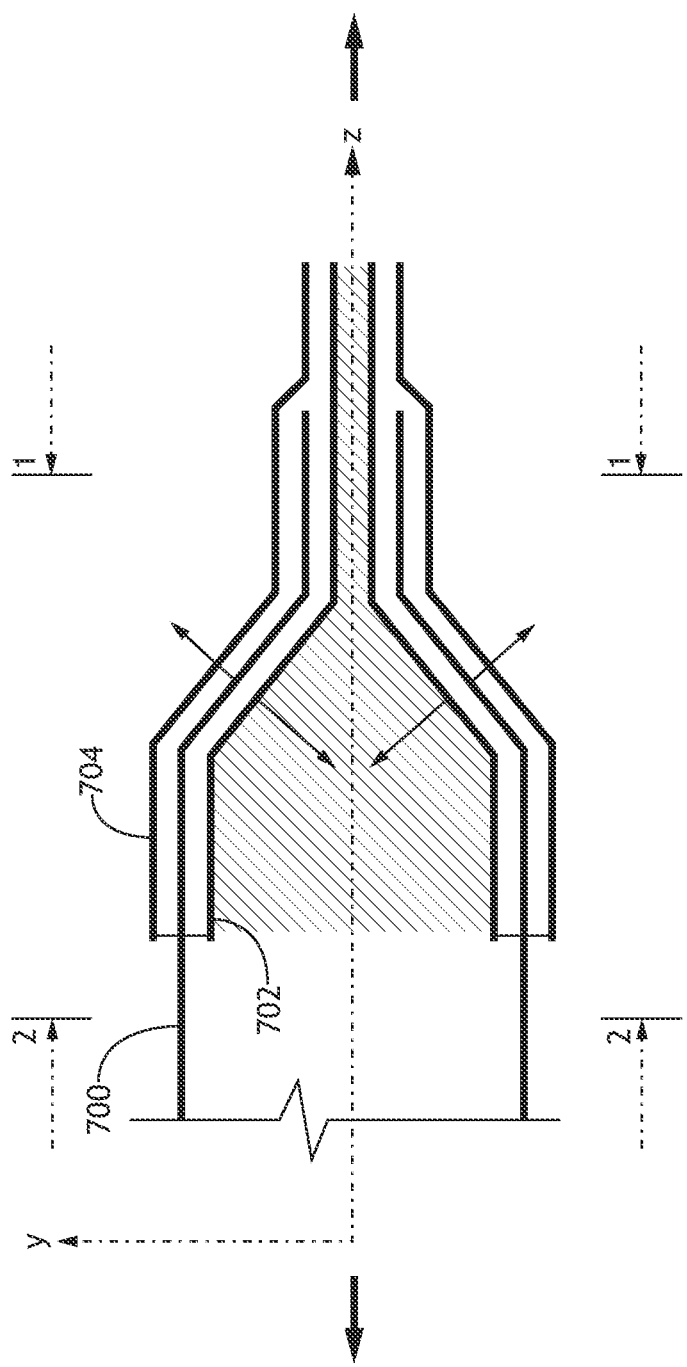
FIG. 7 shows an axial side cross-sectional view of a support element under a tensile load and corresponding load transfer between the internal collar and the composite rod end according to an exemplary embodiment.

Referring to FIG. 7, an axial side cross-sectional view of a support element under an axial tensile load and corresponding load transfer between the internal collar and the composite rod end are shown according to an exemplary embodiment. When a tensile load is applied to the support element via the metal joint, the tensile load is transferred between the composite rod 700 and the internal collar 702 and external collar 704 at regions where the composite rod 700, the internal collar 702, and external collar 704 are deformed to interlock.

Figure 8:
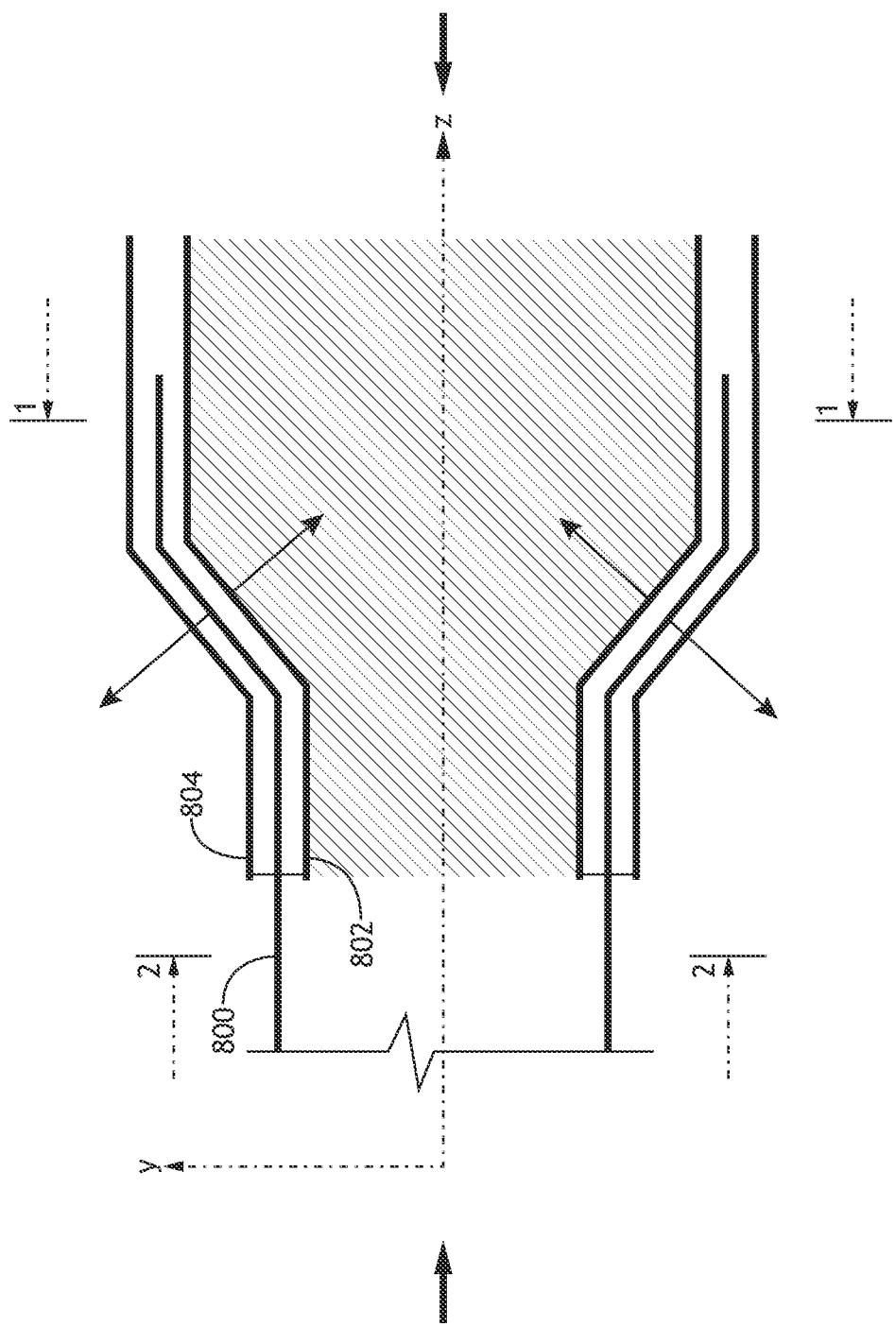
FIG. 8 shows an axial top cross-sectional view of a support element under a compressive load and corresponding load transfer between the external collar and the composite rod end according to an exemplary embodiment.

Referring to FIG. 8, an axial top cross-sectional view of a support element under an axial compressive load and corresponding load transfer between the external collar and the composite rod end are shown according to an exemplary embodiment. When a tensile load is applied to the support element via the metal joint, the tensile load is transferred between the composite rod 800 and the internal collar 802 and external collar 804 at regions where the composite rod 800, the internal collar 802, and external collar 804 are deformed to interlock.

It may be appreciated that under both axial tensile loads (as in FIG. 7) and axial compressive loads (as in FIG. 8), a variable angular cross section of the deformed portion ensures positive contact between all surfaces of the composite rod 700, 800, the internal collar 702, 802, and external collar 704, 804.

Referring to FIGS. 9A-9D, axial side cross-sectional views of deformation clamps according to exemplary embodiments are shown. In at least one embodiment (as in FIG. 9A), a clamp device 900 may define a curved deformation profile 908 to provide a smooth transition between an undeformed portion of a composite rod and a maximally deformed portion to produce a metal collar. In at least one embodiment (as in FIG. 9B), a clamp device 902 may define a stepped deformation profile 908 to transition between an undeformed portion of a composite rod and a maximally deformed portion to produce a metal collar. In at least one embodiment (as in FIG. 9C), a clamp device 904 may define a linear sloped deformation profile 908 to transition between an undeformed portion of a composite rod and a maximally deformed portion to produce a metal collar. In at least one embodiment (as in FIG. 9D), a clamp device 906 may define a block with flat contact surface to deform a terminal portion with the remaining portion of the metal joint deforming according to the properties of the material. Other profiles, e.g., combing multiple segments with either curved or linear slopped or flat shapes, can be used in other embodiments.

It may be appreciated that the type of clamp 900, 902, 904, 906 used for a particular purpose may be defined by the compressive clamping load that will be applied or by the shape of the space where the joint will ultimately be disposed. Certain composite supports may fit a space more easily based on the shape of the joint.

Figure 10:
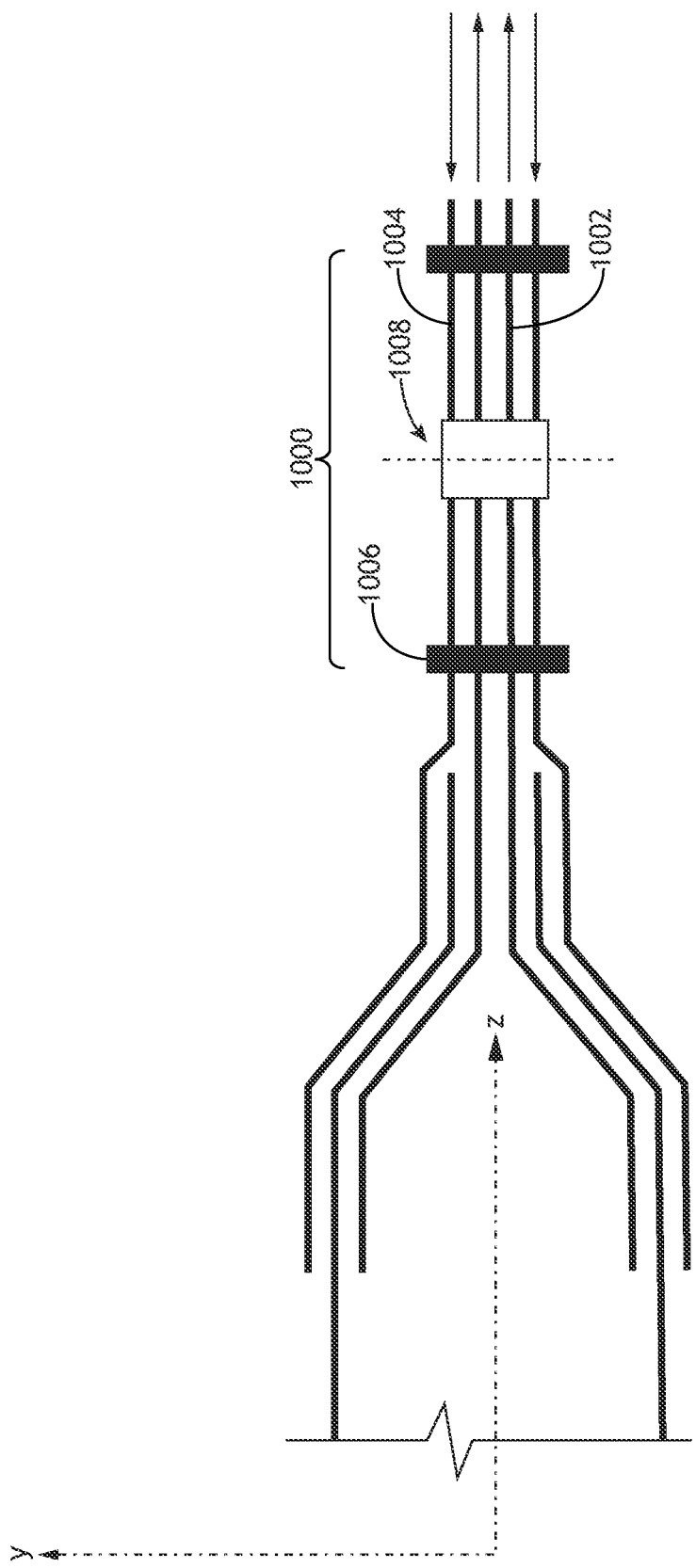
FIG. 10 shows an axial side cross-sectional view of a joint according to an exemplary embodiment.

Referring to FIG. 10, an axial side cross-sectional view of a joint according to an exemplary embodiment is shown. Once composite rods are jointed to deformed metal collars, the metal collars may be joined together. In at least one embodiment, an overlapping portion 1000 of metal collars, such as the flattened metal tab portions, may be affixed to each other, for example, via rivets 1006 or bolted through holes 1008.

In at least one embodiment, deformed internal collars 1002 and deformed external collars 1004 may be configured to interlock with metal joints of other composite rods. For example, a deformed internal collar 1002 of one metal joint may protrude from the corresponding deformed external collar 1004 such that the protruding portion may be inserted in a deformed external collar 1004 that protrudes from a deformed internal collar 1002 of a second composite rod.

Figure 11:
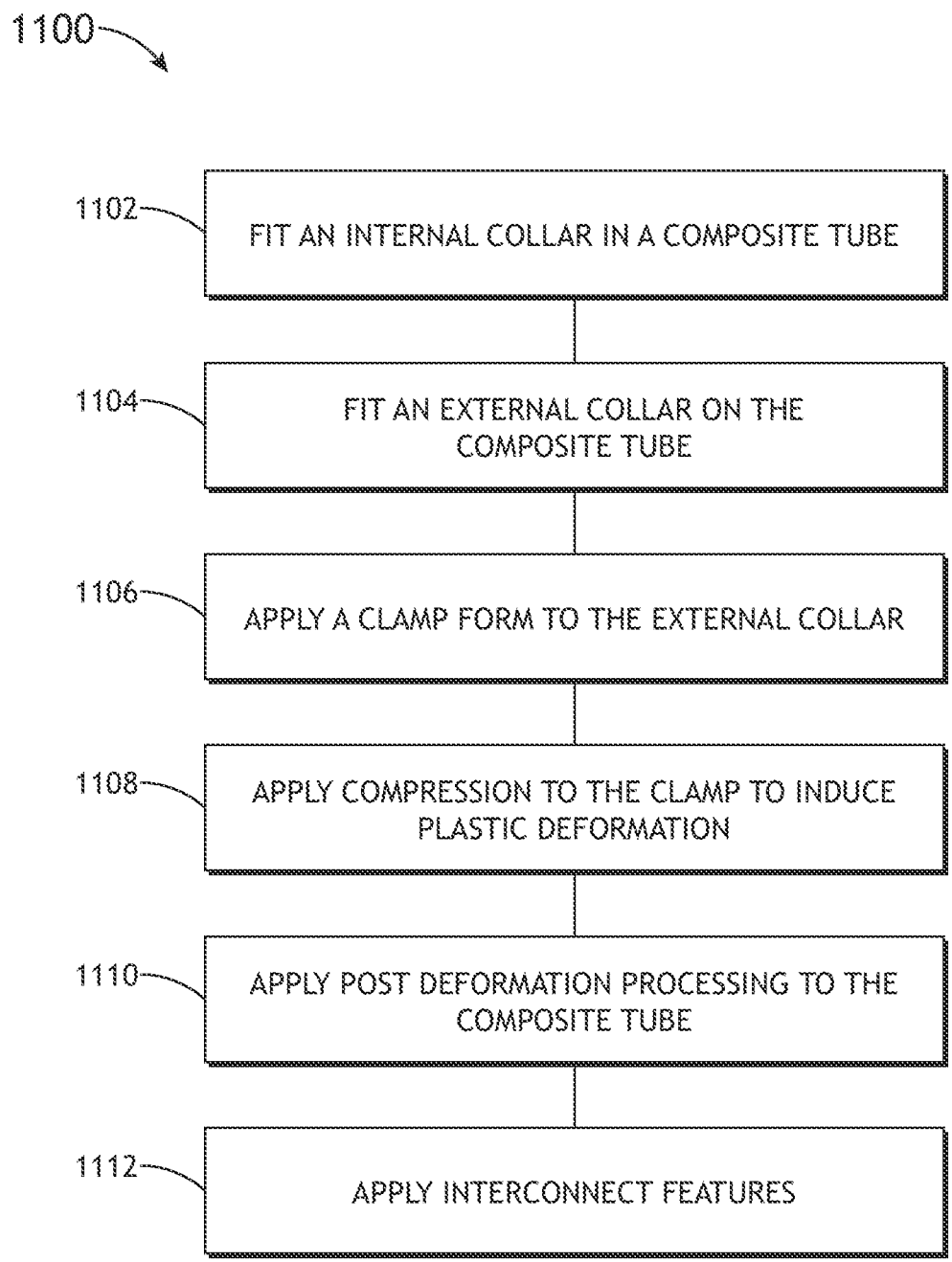
FIG. 11 shows a flowchart of a method for producing a composite support element according to an exemplary embodiment.

Referring to FIG. 11, a flowchart of a method for producing a composite support element according to an exemplary embodiment is shown. During a production process, an internal collar is fitted 1102 into a composite rod. It may be preferrable that the internal collar produces complete contact with the composite rod but some minimal gap is acceptable. In at least one embodiment, tapering or chamfering the internal collar may facilitate insertion into the composite rod. In at least one embodiment, some plastic deformation of the internal collar may be applied in a separate process to direct the deformation of the composite rod in a later compression step.

An external collar is fitted 1104 around the composite rod corresponding to the location of the internal collar. A clamp is applied 1106 to the external collar. The clamp may define a deformation profile to guide the deformation of terminal end of the composite rod and collars.

A compressive force is applied 1108 to the clamp to produce plastic deformation in the composite rod and collars. In at least one embodiment, heat may be applied to the collars and composite rod before the compressive force is applied. In at least one embodiment, the application of compressive force by itself may produce heat that facilitates plastic deformation.

In at least one embodiment, post deformation processing may be applied 1110. Post deformation processing includes a curing step for the thermoset composite rod. In this case, plastic deformation of the composite rod is performed first for a partially cured material.

If a thermoplastic composite rod is used, the plastic deformation can include local heating of the area of deformation. A post deformation step in this case will include cooling to keep the deformed shape.

After the joint is formed via deformation and any post processing steps are applied, fixation features may be added such as rivet or bolt holes in a formed metal tab.

It may be appreciated that while embodiments described herein are directed to producing a flat metal tab, other embodiment produced via clamping are envisioned, including various types of radial compression.

Embodiments of the present disclosure provide a simple method of making composite supports off-the-shelf metallic parts. Such composite supports would provide reduced cost, shortened time of fabrication, and reduced weight. Furthermore, such composite supports may be more easily produced via automation for mass production. Also, such embodiments may obviate supply-chain management and international trade issues, etc.

While aircraft seats where specifically mentioned, embodiments of the present disclosure may be useful in any type of composite joining applications, including bicycles, civil engineering, and transportation linkages.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method for securing joint components to a composite rod comprising:
   inserting an internal collar into an end of the composite rod;
   placing an external collar over the end of the composite rod;
   placing a clamp device around the end of the composite rod over the external collar; and
   plastically deforming the internal collar, the external collar, and the end of the composite rod via applying unidirectional compressive load in a radial direction to the clamp device.

2. The method of claim 1, further comprising:
   heating the end of the composite rod to a predetermined deformation temperature before deformation; and
   cooling the end of the composite rod after deformation, wherein the composite rod comprises a thermoplastic composite.

3. The method of claim 1, further comprising:
   partially curing the end of the composite rod before deformation; and
   curing the end of the composite rod after deformation.

4. The method of claim 1, further comprising machining a deformed portion of the external collar and internal collar to facilitate interconnection to external parts or structures.

5. The method of claim 1, wherein the clamp device defines a deformation profile.

6. The method of claim 5, wherein the deformation profile defines a stepped profile.

7. The method of claim 5, wherein the deformation profile defines a constant radius curve.

8. The method of claim 1, further comprising:
   inserting a second internal collar into an end of a second composite rod;
   placing the external collar over the end of the second composite rod;
   placing the clamp device around the end of the second composite rod over the external collar; and
   deforming the second internal collar, the external collar, and the end of the second composite rod via applying unidirectional compressive load in the radial direction to the clamp device,
   wherein the external collar is configured to receive the composite rod in a first end and the second composite rod in a second end.

* * * * *